United States Patent
Quitter (10) Patent No.: US 10,329,917 B2
(45) Date of Patent: Jun. 25, 2019

(54) GAS TURBINE ENGINE COMPONENT EXTERNAL SURFACE MICRO-CHANNEL COOLING

(71) Applicant: UNITED TECHNOLOGIES CORPORATION, Hartford, CT (US)

(72) Inventor: John Quitter, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 664 days.

(21) Appl. No.: 14/767,922

(22) PCT Filed: Feb. 26, 2014

(86) PCT No.: PCT/US2014/018561
§ 371 (c)(1),
(2) Date: Aug. 14, 2015

(87) PCT Pub. No.: WO2014/137687
PCT Pub. Date: Sep. 12, 2014

(65) Prior Publication Data
US 2015/0377034 A1 Dec. 31, 2015

Related U.S. Application Data

(60) Provisional application No. 61/772,870, filed on Mar. 5, 2013.

(51) Int. Cl.
*F01D 5/14* (2006.01)
*F01D 5/18* (2006.01)
(Continued)

(52) U.S. Cl.
CPC .......... *F01D 5/147* (2013.01); *B23K 26/364* (2015.10); *B23K 26/389* (2015.10); *F01D 5/141* (2013.01);
(Continued)

(58) Field of Classification Search
CPC .......... F05D 2250/28; F05D 2250/29; F05D 2250/294; F05D 2250/60; F05D 2250/61;
(Continued)

(56) References Cited

U.S. PATENT DOCUMENTS 5,114,099 A * 5/1992 Gao ................... B64C 21/10
244/130
5,256,886 A 10/1993 Wolf et al.
(Continued)

FOREIGN PATENT DOCUMENTS

CN 101358545 2/2009

OTHER PUBLICATIONS

International Search Report for PCT Application No. PCT/US2014/018561, dated May 26, 2014.
(Continued)

*Primary Examiner* — Mark A Laurenzi
*Assistant Examiner* — Xiaoting Hu
(74) *Attorney, Agent, or Firm* — Carlson, Gaskey & Olds, P.C.

(57) ABSTRACT

A gas turbine engine component that includes a structure having a surface which includes multiple cooling channels having a width of 20-30 μm and a depth of 25-50 μm.

20 Claims, 5 Drawing Sheets (51) Int. Cl.
*F01D 5/28* (2006.01)
*B23K 101/00* (2006.01)
*B23K 26/364* (2014.01)
*B23K 26/382* (2014.01)

(52) U.S. Cl.
CPC .............. *F01D 5/186* (2013.01); *F01D 5/288* (2013.01); *B23K 2101/001* (2018.08); *F05D 2220/32* (2013.01); *F05D 2230/13* (2013.01); *F05D 2230/14* (2013.01); *F05D 2230/90* (2013.01); *F05D 2240/31* (2013.01); *F05D 2250/21* (2013.01); *F05D 2250/28* (2013.01); *F05D 2250/29* (2013.01); *F05D 2250/294* (2013.01); *F05D 2250/60* (2013.01); *F05D 2250/61* (2013.01); *F05D 2250/611* (2013.01); *F05D 2260/202* (2013.01); *F05D 2260/204* (2013.01); *Y02T 50/673* (2013.01); *Y02T 50/676* (2013.01); *Y02T 50/6765* (2018.05)

(58) Field of Classification Search
CPC ......... F05D 2250/611; F05D 2260/204; F05D 2260/221; F05D 2260/2212; F05D 2260/2214; F05D 2260/22141; F05D 2240/31; F05D 2230/90; F05D 2230/10–14; F01D 5/288; F01D 5/141; F01D 5/147; B23K 26/36–389; B23K 2201/001
See application file for complete search history.

(56) References Cited

U.S. PATENT DOCUMENTS

| | | | | |
|---|---|---|---|---|
| 5,327,727 A | * | 7/1994 | Ward | F23R 3/002 |
| | | | | 60/752 |
| 5,337,568 A | * | 8/1994 | Lee | F01D 5/18 |
| | | | | 416/236 R |
| 5,419,971 A | * | 5/1995 | Skelly | C23C 4/02 |
| | | | | 428/161 |
| 5,653,110 A | * | 8/1997 | Lee | F01D 5/186 |
| | | | | 416/95 |
| 6,183,197 B1 | * | 2/2001 | Bunker | F01D 5/141 |
| | | | | 415/178 |
| 6,224,337 B1 | | 5/2001 | Lieland et al. | |
| 6,461,107 B1 | | 10/2002 | Lee et al. | |
| 6,488,238 B1 | * | 12/2002 | Battisti | B64C 21/025 |
| | | | | 244/204 |
| 6,589,600 B1 | * | 7/2003 | Hasz | B22C 9/10 |
| | | | | 427/264 |
| 6,675,881 B1 | * | 1/2004 | Rago | F28D 7/106 |
| | | | | 138/38 |
| 6,703,137 B2 | * | 3/2004 | Subramanian | C23C 4/18 |
| | | | | 416/241 B |
| 7,104,067 B2 | * | 9/2006 | Bunker | F23M 5/00 |
| | | | | 60/752 |
| 7,386,980 B2 | * | 6/2008 | Green | F23R 3/005 |
| | | | | 60/752 |
| 8,092,179 B2 | | 1/2012 | Paauwe et al. | |
| 2002/0141869 A1 | | 10/2002 | Lee et al. | |
| 2002/0141872 A1 | * | 10/2002 | Darolia | F01D 5/182 |
| | | | | 416/241 R |
| 2003/0026697 A1 | * | 2/2003 | Subramanian | C25D 1/02 |
| | | | | 416/97 R |
| 2003/0155667 A1 | | 8/2003 | Devoe et al. | |
| 2009/0017260 A1 | * | 1/2009 | Kulkarni | C23C 4/18 |
| | | | | 428/161 |
| 2011/0014060 A1 | * | 1/2011 | Bolcavage | F01D 5/288 |
| | | | | 416/241 R |
| 2011/0087362 A1 | | 4/2011 | Vogt et al. | |
| 2012/0263576 A1 | | 10/2012 | Lacy et al. | |
| 2013/0122259 A1 | * | 5/2013 | Lee | C23C 30/00 |
| | | | | 428/164 |

OTHER PUBLICATIONS

International Preliminary Report on Patentability for International Application No. PCT/US2014/018561 dated Sep. 17, 2015.

* cited by examiner

GAS TURBINE ENGINE COMPONENT EXTERNAL SURFACE MICRO-CHANNEL COOLING

BACKGROUND

This disclosure relates to a gas turbine engine component, such as an airfoil. More particularly, the disclosure relates to cooling micro-channels provided on a surface of the component.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components cooling features enable the component to be exposed to higher operating temperatures. Protecting airfoil surfaces from the super-heated fluid sustained at elevated temperatures within the turbine section is of increasing importance, especially as greater thrust metrics drive engine performance.

SUMMARY

In one exemplary embodiment, a gas turbine engine component including a structure having a surface which includes multiple cooling channels having a width of 20-30 µm and a depth of 25-50 µm.

In a further embodiment of the above, the surface is a line-of-sight surface.

In a further embodiment of the above, the structure is an airfoil having an internal cooling passage.

In a further embodiment of any of the above, the structure includes a substrate. A thermal barrier coating is adhered to the substrate with a bond coat. The thermal barrier coating provides the exterior surface.

In a further embodiment of any of the above, the substrate is a nickel alloy. The thermal barrier coating is a ceramic.

In a further embodiment of any of the above, the cooling channels include a generally U-shaped cross-section.

In a further embodiment of any of the above, the cooling channels include a generally V-shaped cross-section.

In a further embodiment of any of the above, the cooling channels are arranged parallel to one another.

In a further embodiment of any of the above, the cooling channels are arranged in an intersecting pattern.

In a further embodiment of any of the above, the cooling channels form pyramid shaped structures.

In a further embodiment of any of the above, the cooling channels are arranged in a circular pattern.

In a further embodiment of any of the above, the cooling channels are arranged at acute angles relative to one another.

In a further embodiment of any of the above, the cooling channels provide a circular recess.

In another exemplary embodiment, a method of forming micro-channels on an exterior surface of a gas turbine engine component includes directing a laser beam at a surface of a gas turbine engine component structure, and creating a cooling channel on the surface having a width of 20-30 µm and a depth of 25-50 µm.

In a further embodiment of any of the above, the directing step includes pulsing the laser beam at a period in a range of $10^{-6}$ s to $10^{-15}$ s.

In a further embodiment of any of the above, the directing step includes moving the surface relative to the laser beam.

In a further embodiment of any of the above, the directing step includes guiding the laser beam through telecentric lenses with galvo mirrors to move the laser beam across the surface.

In a further embodiment of any of the above, the structure is an airfoil that has an internal cooling passage.

In a further embodiment of any of the above, the structure includes a substrate. A thermal barrier coating is adhered to the substrate with a bond coat. The thermal barrier coating provides the surface.

In a further embodiment of any of the above, the substrate is a nickel alloy, and the thermal barrier coating is a ceramic.

In a further embodiment of any of the above, the cooling channel is configured to include at least one of a generally U-shaped cross-section and a generally V-shaped cross-section. Multiple cooling channels are arranged at least one of parallel to one another, in an intersecting pattern, in pyramid shaped structures, at acute angles relative to one another, in a curved pattern, and to provide a circular recess.

BRIEF DESCRIPTION OF THE DRAWINGS

The disclosure can be further understood by reference to the following detailed description when considered in connection with the accompanying drawings wherein.

DETAILED DESCRIPTION

Figure 1:
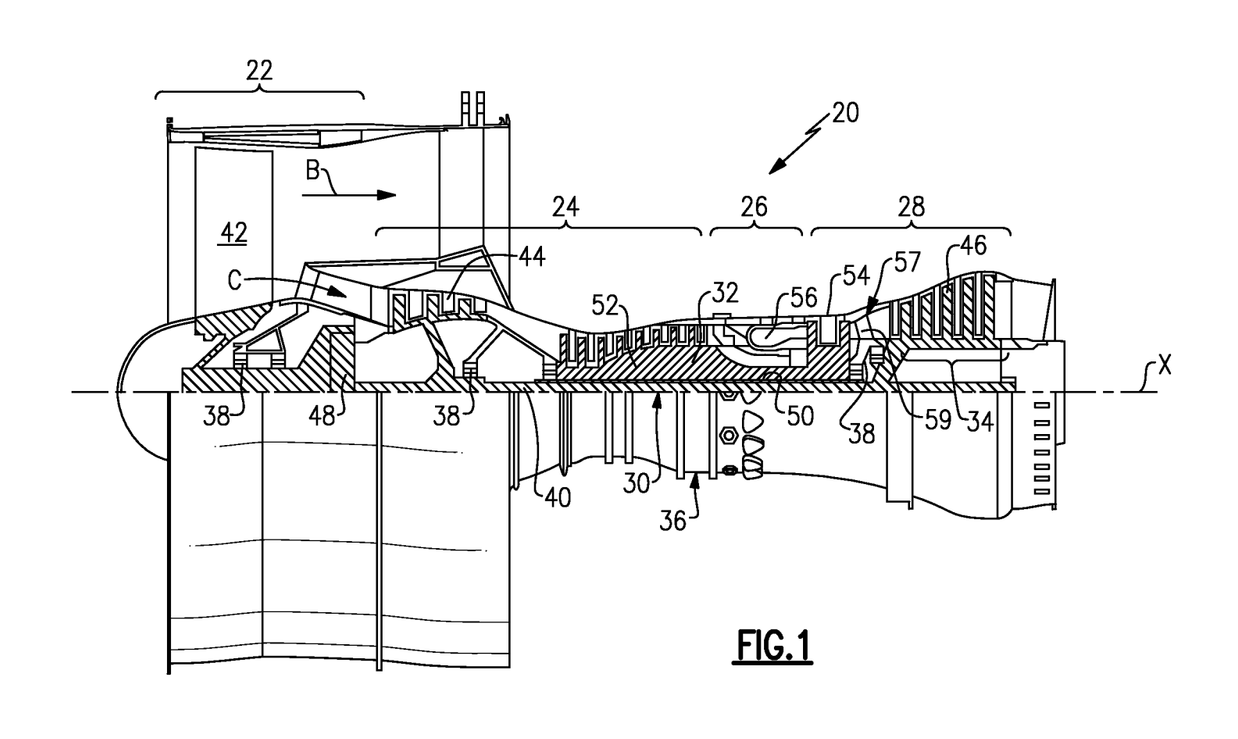
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

The disclosed serpentine cooling passage may be used in various gas turbine engine components. For exemplary purposes, a turbine blade 64 is described. It should be understood that the cooling passage may also be used in vanes, blade outer air seals, and turbine platforms, for example.

Figure 2A:
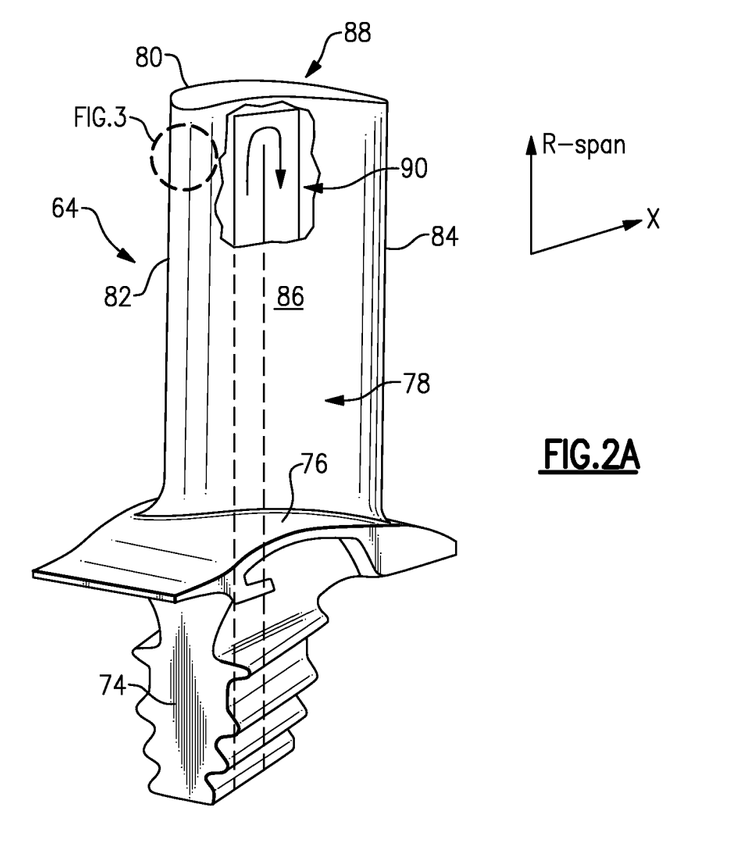
FIG. 2A is a perspective view of the airfoil having the disclosed cooling passage.
Figure 2B:
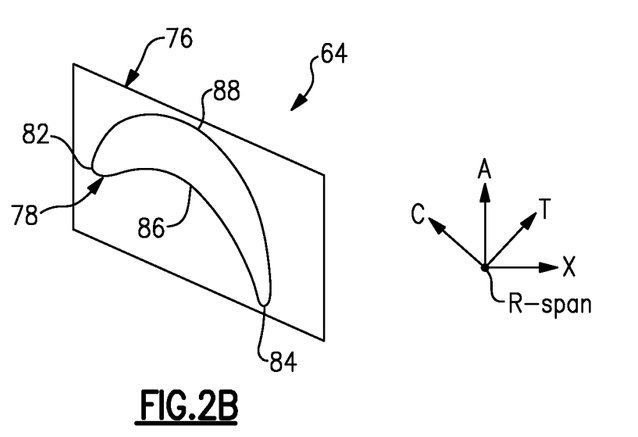
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

In one example, a laser machining system is used to provide micro-channel cooling features on the exterior, or line-or-sight surface of gas turbine engine components, such as airfoils. Short pulse duration lasers (i.e., in the period range of $10^{-6}$ s to $10^{-15}$ s) enable the machining of fine features (i.e., width 102 of 20-30 µm; depth 104 of 25-50 µm) into ceramic and metallic materials.

Figure 3:
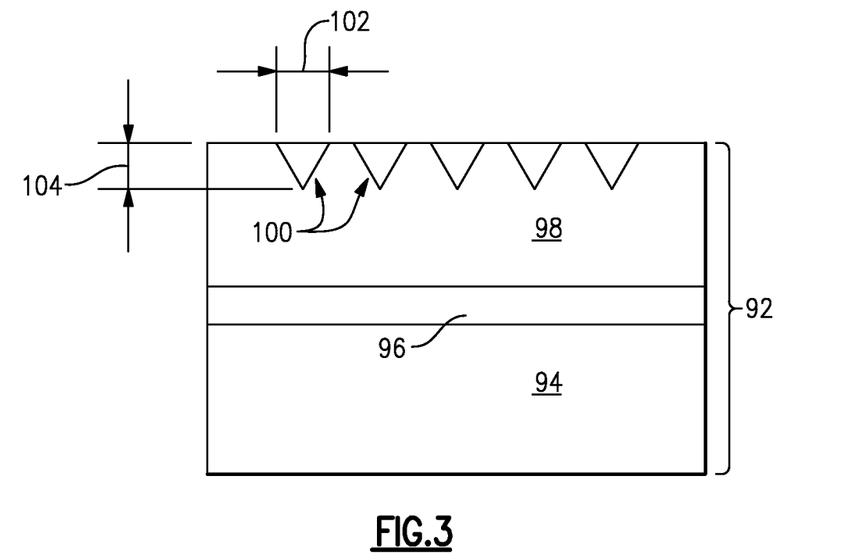
FIG. 3 is a cross-sectional view of a substrate with a coating with micro-channels.
Figure 4:
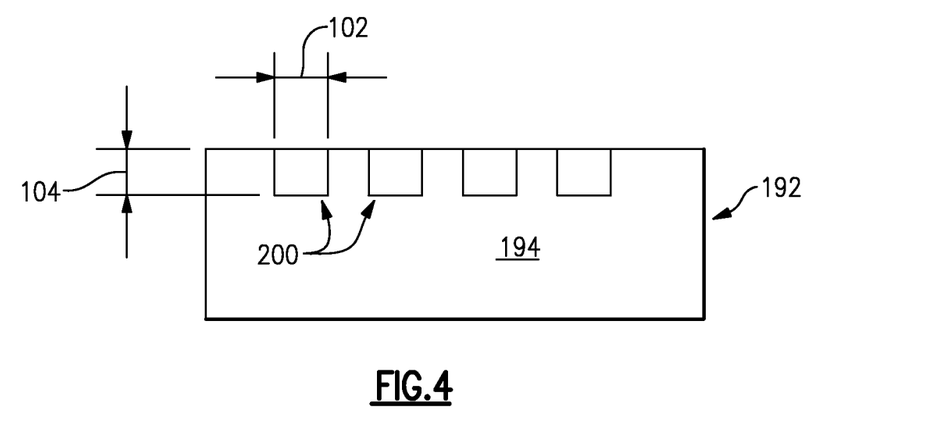
FIG. 4 is a cross-sectional view of a substrate with micro-channels.

FIGS. 3 and 4 illustrate example micro-channels of 'V' and 'U' cross-sectional shapes. Referring to FIG. 3, a structure 92 includes a substrate 94 having a bond coat 96 that supports a thermal barrier coating (TBC) 98, which may be ceramic. In one example, the substrate 94 is a nickel alloy, and the bond coat 96 is metallic. Other materials may be used as well. In the example shown in FIG. 4, the micro-channels 200 may be provided in a metallic substrate 194 of the structure 192.

The surface texture and wall/depth uniformity of the micro-channels 100 are of high quality due to the short pulse duration and high pulse frequency. The disclosed laser machining process does not damage the TBC 98 or other substrates.

Figure 5:
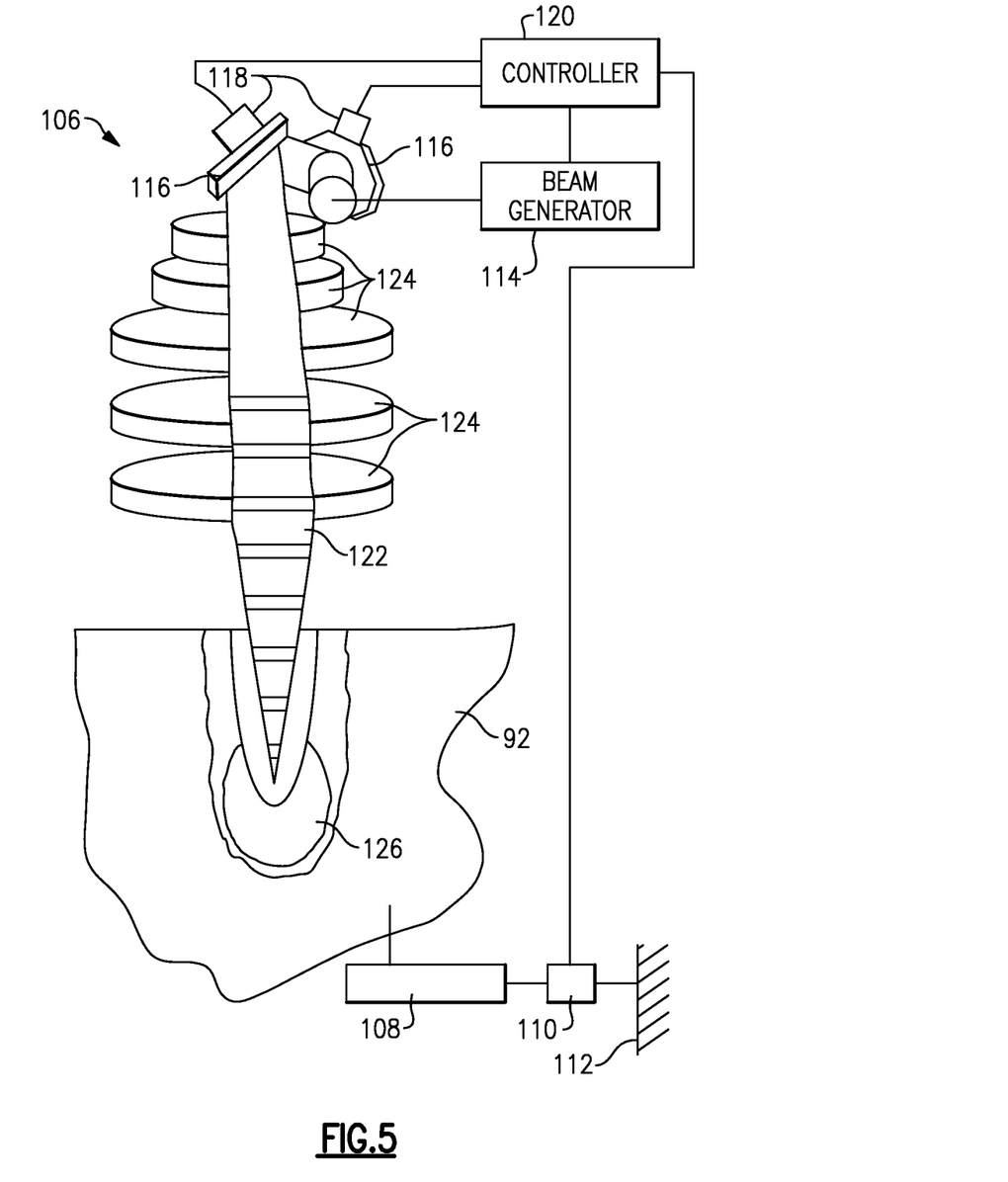
FIG. 5 is a schematic view of a laser machining system for producing micro-channels.

An example short pulse duration laser machining system 106 is shown in FIG. 5. Short pulse duration lasers produce a heat affected zone (HAZ) that is significantly diminished with each order of magnitude that the pulse duration is reduced.

The system 106 includes a fixture 108 that supports the structure 92. An actuator 110 may be used to move the fixture 108 relative to a support 112 to provide another degree of freedom during the machining process. In the example, a pair of galvo mirrors 116 are used to direct a laser beam 122 from a laser beam generator 114 through telecentric lenses 124 onto the structure 92. An actuator 118 may be coupled to each galvo mirro 116 to move the laser beam 122 along the structure 92 during machining. The actuators 110, 118 communicate with a controller 120, which also communicates with the laser beam generator. The controller 120 is programmed to produce micro-channels on the structure 92 in a desired pattern.

The high frequency pulse laser beam coupled to the galvo mirrors 118 and telecentric lenses 124 optimizes the pulse-to-pulse overlap, creating extremely high quality surface finishes. The system 106 may also incorporate a cross-jet gas assist, if desired, to reduce the laser plume and prevent particulate build-up on the lens surface. The high speed controller 120 manipulates 'X' and 'Y' mirrors to steer the beam axis, generating a precise pattern of micro-channels arranged in, for example, a cross-hatch and/or circular pattern. In one example, the system 106 can maneuver the 'X' and 'Y' beam axis across a four square inch area (while maintaining focus), without having to move the structure 92.

Figure 6A:
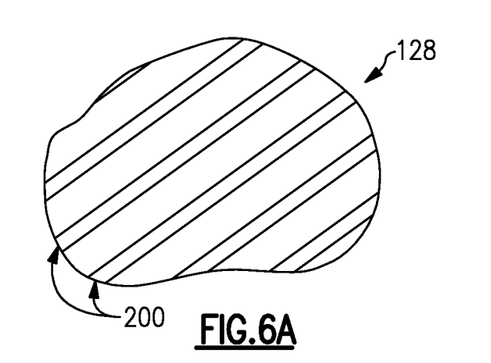
FIG. 6A illustrates micro-channels in a parallel arrangement.
Figure 6B:
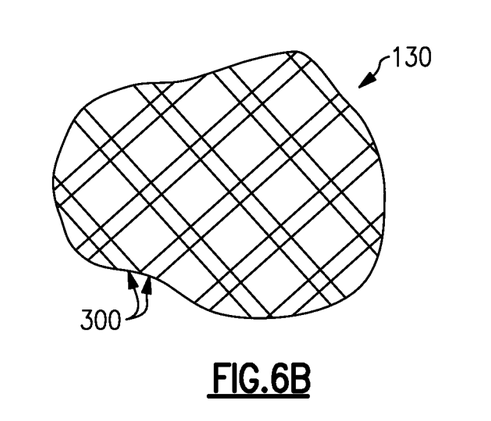
FIG. 6B illustrates micro-channels in an intersecting arrangement.
Figure 6C:
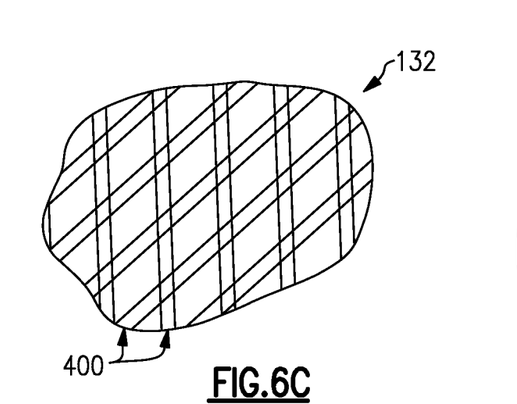
FIG. 6C illustrates micro-channels in another intersecting arrangement.
Figure 6D:
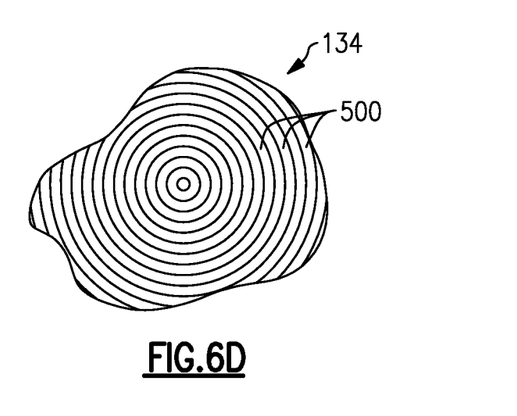
FIG. 6D illustrates micro-channels in a circular arrangement.
Figure 6E:
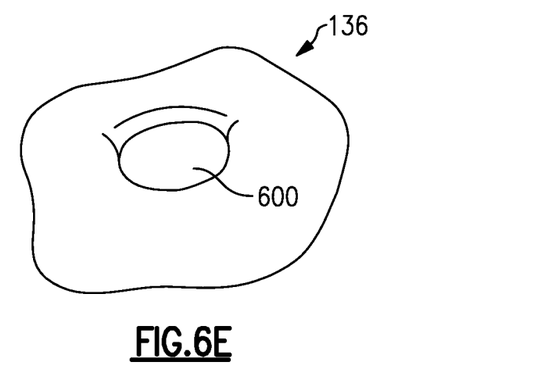
FIG. 6E illustrates a micro-channel providing a recess.
Figure 6F:
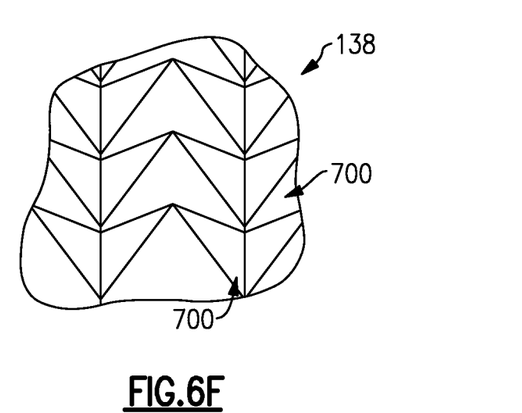
FIG. 6F illustrates micro-channels in a pyramidal arrangement.

Patterns can be created that consist of 'U' and 'V' channels of any depth/spacing/incident angle, and a cross-hatch pattern, as shown in FIGS. 6A-6F. Features may also be created using both channel types, incorporating trapezoidal shapes with cross angles ranging from ninety degrees through zero degrees. This will enable raised square structures from the U-channel machining and raised pyramid structures from the V-channels (FIG. 6F). It is possible to etch circular (FIG. 6D) and serpentine patterns, and generate evenly spaced micro-machined depressions or recesses (FIG. 6E) to provide a conformed boundary layer, such as with a golf ball texture. Blind holes/slots can also be achieved via this method.

FIG. 6A depicts a pattern 128 of parallel micro-channels 200. FIG. 6B illustrates a cross-hatched pattern 130 with micro-channels 300 at right angles to one another. FIG. 6C illustrates a pattern 130 with micro-channels 400 an acute angles relative to one another. FIG. 6D illustrates micro-channels 500 arranged in a circular pattern 134, and FIG. 6E shows a micro-channel 600 providing a pattern of depressions or recesses. FIG. 6F illustrates tightly intersecting micro-channels 700 that provide pyramidal shapes.

There are an unlimited number of feature designs that can be machined onto the surface of gas turbine engine components or other aircraft structures (coated or uncoated), with depth dimensions that is less than the coating thickness. It is possible to laser etch onto a concave/convex surface, and over advanced dihedral curved surfaces to produce a larger boundary layer. The machining of surface trenches can also be accomplished via a laser micro-machining process. Material can be effectively removed without recast and thermal damage, and without introducing stress and micro-cracking propagation through the ceramic coat, bond coat and the base metal. The channel vectors can be aligned with the existing cooling hole flow path to enhance the cooling effect. Designs can be incorporated into blade/vane platform surfaces on both the suction and pressure sides of the airfoil as well. This technology may also be used with other hardware containing relatively flat surfaces, such as turbine exhaust cases or combustor panels.

The disclosed laser machining technique can also be applied to composites, and other nonmetallic structures. The disclosed micro-channels can be machined directly into the airfoil surface (coated or uncoated), with the use of a short pulse duration galvo-mirror laser system, which can enhance the laminar flow over the hardware surface, which increases the cooling effectiveness for the entire component.

Although example embodiments have been disclosed, a worker of ordinary skill in this art would recognize that certain modifications would come within the scope of the claims. For that and other reasons, the following claims should be studied to determine their true scope and content.

What is claimed is:
1. A gas turbine engine component comprising:
a structure having a surface, the surface including multiple cooling channels having a width of 20-30 µm and a depth of 25-50 µm, wherein the structure includes a substrate, a thermal barrier coating is adhered to the substrate with a bond coat having a uniform thickness, the thermal barrier coating providing the surface with the channels provided only in the thermal barrier coating such that the bond coat is arranged on a side of the thermal barrier coating opposite the channels, wherein the cooling channels are arranged in an intersecting pattern.

2. The gas turbine engine component according to claim 1, wherein the surface is a line-of-sight surface.

3. The gas turbine engine component according to claim 1, wherein the structure is an airfoil having an internal cooling passage.

4. The gas turbine engine component according to claim 1, wherein the substrate is a nickel alloy, and the thermal barrier coating is a ceramic.

5. The gas turbine engine component according to claim 1, wherein the cooling channels include a generally U-shaped cross-section.

6. The gas turbine engine component according to claim 1, wherein the cooling channels include a generally V-shaped cross-section.

7. The gas turbine engine component according to claim 1, wherein the cooling channels form pyramid shaped structures.

8. The gas turbine engine component according to claim 1, wherein the cooling channels are arranged at acute angles relative to one another.

9. A gas turbine engine component comprising:
a structure having a surface, the surface including multiple cooling channels having a width of 20-30 µm and a depth of 25-50 µm, wherein the structure includes a substrate, a thermal barrier coating is adhered to the substrate with a bond coat having a uniform thickness, the thermal barrier coating providing the surface with the channels provided only in the thermal barrier coating such that the bond coat is arranged on a side of the thermal barrier coating opposite the channels, wherein the cooling channels are arranged in a circular pattern.

10. The gas turbine engine component according to claim 9, wherein the surface is a line-of-sight surface.

11. The gas turbine engine component according to claim 9, wherein the structure is an airfoil having an internal cooling passage.

12. The gas turbine engine component according to claim 9, wherein the substrate is a nickel alloy, and the thermal barrier coating is a ceramic.

13. The gas turbine engine component according to claim 9, wherein the cooling channels include a generally U-shaped cross-section.

14. The gas turbine engine component according to claim 9, wherein the cooling channels include a generally V-shaped cross-section.

15. A gas turbine engine component comprising:
a structure having a surface, the surface including multiple cooling channels having a width of 20-30 µm and a depth of 25-50 µm, wherein the structure includes a substrate, a thermal barrier coating is adhered to the substrate with a bond coat having a uniform thickness, the thermal barrier coating providing the surface with the channels provided only in the thermal barrier coating such that the bond coat is arranged on a side of the thermal barrier coating opposite the channels, wherein the cooling channels provide a circular recess without circumscribing the structure.

16. The gas turbine engine component according to claim 15, wherein the surface is a line-of-sight surface.

17. The gas turbine engine component according to claim 15, wherein the structure is an airfoil having an internal cooling passage.

18. The gas turbine engine component according to claim 15, wherein the substrate is a nickel alloy, and the thermal barrier coating is a ceramic.

19. The gas turbine engine component according to claim 15, wherein the cooling channels include a generally U-shaped cross-section.

20. The gas turbine engine component according to claim 15, wherein the cooling channels include a generally V-shaped cross-section.

\* \* \* \* \*